Sept. 27, 1966     J. W. McHUGH ETAL     3,275,902
SEALED ELECTROLYTIC CAPACITOR IN HERMETICALLY SEALED CASE
Filed Aug. 1, 1963     3 Sheets-Sheet 1

INVENTORS
JOHN W. McHUGH
RONALD A. BAKER
BY
ATTORNEY

INVENTORS
JOHN W. McHUGH
RONALD A. BAKER
BY

ATTORNEY

United States Patent Office 3,275,902
Patented Sept. 27, 1966

3,275,902
SEALED ELECTROLYTIC CAPACITOR IN
HERMETICALLY SEALED CASE
John W. McHugh, Fillmore, and Ronald A. Baker, Indianapolis, Ind., assignors to P. R. Mallory & Co., Inc., Indianapolis, Ind., a corporation of Delaware
Filed Aug. 1, 1963, Ser. No. 299,442
12 Claims. (Cl. 317—230)

The present invention relates generally to electrolytic devices and has specific pertinence to the means and method for hermetically sealing a plurality of electrolytic capacitor cells within a corrosion-resistant container under an accurately established compressive preload.

Hermetic sealing of capacitor units is required in certain applications where positive isolation from environmental effects must be achieved. In such instances, the familiar resilient or elastomeric seals, grommets, rings, etc., cannot accomplish the desired result. Instead, there must occur a joining or fusion of the closure members in a manner which prevents ingress or egress of moisture, gases, liquids, and other agents. Closure by joining of materials is generally effected by soldering welding, or glass-to-metal bonding.

Since special care is required to obtain a true hermetic seal, the cost of fabricating and assembling a capacitor having such a seal is accordingly increased. One method of hermetic sealing comprises the containment of a capacitor unit or cell within a suitable housing whereupon the external closures are sealed by fusion or joining. A capacitor "cell," as referred to herein, contemplates a conventional electrolytic unit having a porous anode, a liquid electrolyte, an electrolyte vessel serving as the cathode, and a resilient seal which separates the anode and cathode electrically. Although not possesed of a true hermetic seal within themselves, such cells are often capable of operation throughout a comparatively broad range of temperatures without electrolyte leakage if adequate compressive force is maintained on the resilient seal.

Special provisions are necessary, therefore, to confine the liquid electrolyte within its chamber even though external leakage is precluded by the hermetically sealed outer housing. This is particularly critical in miniature capacitors subjected to high temperatures where even a slight degree of leakage will critically affect electrical performance. Moreover, where the liquid electrolyte is corrosive in nature as, for example, sulfuric acid, the need for local confinement is especially apparent.

Although a compressive preload may be maintained on the resilient seal of the capacitor cell by means of a spring disposed between the cell and the external container, it is very difficult to accurately control the magnitude of this preload in the assembled product. This is because of tolerance variations in the casing length resulting from the method of closure, thereby making it difficult, if not impossible, to insure a desired spring deflection in the final product. As a consequence, the precise compressive preload on the capacitor cell is not predictable, and the avoidance of electrolyte leakage throughout a broad temperature range is not guaranteed.

While the hermetically sealed capacitor assembly described above prevents deleterious external agents from reaching the capacitor cell enclosed therewithin, the container or housing itself must often be rendered corrosion-resistant in order to meet service specifications. Ordinary steel is often chosen to hermetically house the capacitor cell because of its good structural and mechanical properties. However, because of the susceptibility of steel to corrosive attack, the container exterior must be subjected to electroplating or equivalent techniques which deposit thereon a coating of copper, nickel, cadmium, or some combination of these three, thereby rendering the container corrosion-resistant. Where a portion of the container employs male threads, however, the addition of plated metal thereto changes the thread dimensions and may create tolerance problems. Masking provisions increase the already high production cost factor.

Among the corrosion-resistant materials suitable for consideration herein, stainless steel is perhaps the most attractive. Although the use of stainless steel affords excellent corrosion resistance coupled with superior structural properties, its feasibility as a container in a device of this type has heretofore been limited by fabrication, welding, and processing difficulties. In the present invention, however, there is disclosed the means and method for housing a plurality of electrolytic capacitor cells in a series stack within a stainless steel container and wherein an exact compressive preload is introduced and maintained to confine the cell electrolyte throughout an operating temperature range of $-55°$ C. to $+200°$ C. True hermetic sealing of the stainless steel container is accomplished in a manner which provides a capacitor assembly having superior electrical, mechanical, chemical, and environmental properties. The container may be readily processed in various length dimensions to accommodate the desired quantity of cells under the proper compressive preload. Such a device affords versatility of capacitance values by offering multiples of a basic universal capacitance. Accordingly, the extent of capacitor inventory is thereby reduced because a single type cell may be employed in the multiple-unit series stack.

It is an object of the present invention, therefore, to provide a hermetically sealed container of corrosion-resistant metal adapted to house a plurality of electrolytic capacitor cells under an exact compressive preload for operation throughout a temperature range of $-55°$ C. to $+200°$ C.

It is a further object of the present invention to provide a capacitor assembly wherein various multiples of a basic universal cell may be hermetically housed within a corrosion-resistant container, thereby introducing versatility of total capacitance values under a single fabrication procedure.

Another object of the present invention is to provide a practical and accurate means of establishing the desired compressive preload on the capacitor cells while being able to maintain this preload throughout the operating life of the device.

Still another object of the present invention is to employ stainless steel material to contain the capacitor cells, thereby circumventing the need for corrosion-resistant treatment of the container exterior.

Yet another object of the present invention is to hermetically seal the ends of the stainless steel container by an efficient and effective welding closure technique.

Still another object of the present invention is to obviate the need for a special venting device during the intermediate processing step which comprises thermal cycling. By only partially welding the container closure after preloading the capacitor cells, gas escapement is afforded and the weld may later be completed for hermetic sealing.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the present invention and the nature thereof will become apparent from the following description considered in connection with the accompanying figures of the drawing and wherein like reference characters describe elements of similar function therein, and wherein the scope of the invention is determined rather from the dependent claims.

In the drawings:

FIGURE 1A is a cross-sectional view of the capacitance cell shown in FIGURE 1.

Generally speaking, the present invention provides the means and method for hermetically sealing a plurality of electrolytic capacitor cells within a corrosion-resistant container under a determined compressive preload. One of the closure members is slidably adapted during assembly to transmit an externally applied load to deflect a spring washer or equivalent preload means. Upon establishment of the correct compressive preload within the cell stack, the slidable closure member is joined to the container to complete the hermetic sealing of the capacitor assembly.

Figure 1:
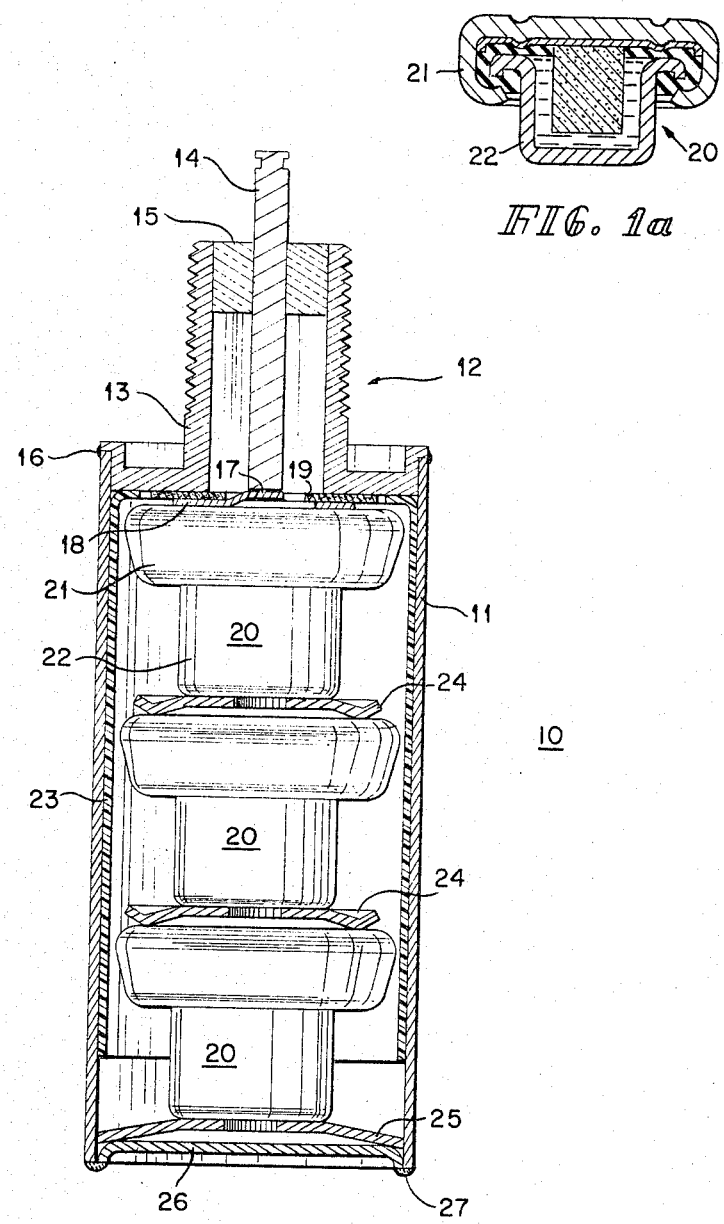
FIGURE 1 is a sectional elevation view of the electrolytic device of the present invention containing, for illustrative purposes, three capacitor cells.

Referring now to FIGURE 1 of the drawing, the composite electrolytic device of the present invention is indicated generally by reference numeral 10. Tubular case 11, which is composed of corrosion-resistant material such as stainless steel, constitutes the side housing of the device and possesses negative polarity. Upper terminal assembly 12 serves to enclose the upper opening to tubular case 11. The structural member of upper terminal assembly 12 is flanged collar 13, also composed of corrosion-resistant metal such as stainless steel. Within the bore of flanged collar 13 is disposed positive terminal pin 14, the material of which is preferably a nickel-iron alloy. Insulating body 15, a glass-like ring, is joined by compression molding with flanged collar 13 and positive terminal pin 14 to form a hermetic seal.

In order to hermetically seal the junction of flanged collar 13 with the upper end of tubular case 11, a weld bead 16 is generated around the periphery thereof. Where the material to be joined is stainless steel, excellent weld results have been obtained by the tungsten electrode-inert gas shielded arc process. Contiguous with the bottom of positive terminal pin 14 is finger 17 of contact disc 18, said finger being resistance welded to pin 14. Mica washer 19 affords electrical insulation between flanged collar 13 and contact disc 18.

With continued reference to FIGURE 1, the universal capacitor cells are indicated by reference numeral 20. Cell 20 will typically contain a porous anode of film-forming metal, an anodic head 21, a liquid electrolyte, a metal cathode 22, and a resiilent electrolyte seal serving also as an insulator between the anode and cathode. Vertical compression of cell 20 will cause the resilient seal to further resist electrolyte leakage.

To prevent electrical shorting of anodic head 21 with tubular case 11, a cylindrical preformed liner 23 of insulating material is disposed adjacent the inside diameter of case 11. A suitable material for liner 23 is polytetrafluoroethylene.

Between each pair of cells 20 is placed a metallic spring washer 24 which maintains the desired preload on the cells. Spring washer 24 is contoured to fit a corresponding concentric groove in the top of cell 20 and in this manner it is radially piloted with respect to cell 20. Beneath the lowest cell in the vertical stack is positioned a bottom spring 25, which is also of the metallic washer type. The outside diameter of bottom spring 25 is contiguous with the bore of tubular case 11. Closure of the lower end of tubular case 11 is afforded by bottom cup 26, a corrosion-resistant member such as stainless steel, and hermetic sealing of the junction may be accomplished by tungsten electrode-inert gas welding as indicated by circumferential bead 27. The polarity of metal cathode 22 is thus conveyed to tubular case 11 by means of bottom spring 25 and bottom cup 26.

With further reference to FIGURE 1 of the drawing, the procedure by which electrolytic device 10 is assembled is described as follows. Upper terminal assembly 12 is inserted into the upper end of tubular case 11 and secured therewith by weld 16. It will be recalled that mica washer 19 and contact disc 18 are carried with upper terminal assembly 12 by virtue of finger 17 being spot welded to the bottom of positive terminal pin 14. The partial assembly is then inverted to allow easy insertion of the internal stack. For ease of handling, the desired quantity of cells and spring washers is preassembled inside preformed liner 23 prior to introduction into tubular case 11. Thereupon, bottom cup 26 is inserted into tubular case 11 as the final component. Because the length of tubular case 11 is initially greater than the uncompressed stack of internal parts, the inverted assembly may then be readily placed in a loading fixture preparatory to application of compressive preload.

The next step in the assembly process constitutes the application of a predetermined external load to bottom cup 26, thereby deflecting bottom spring 25 and spring washers 24. When the correct load has been applied and the resulting deflection is stabilized, the open end of tubular case 11 is trimmed flush with the lip of bottom cup 26. Thereupon, a partial circumferential weld or a multiple-point tack weld is made at the location indicated by reference numeral 27 in FIGURE 1. The incomplete nature of this interim weld permits venting of the assembly during the thermal cycling step while still providing adequate strength to hold the compressive preload. As the final step herein, weld 27 is extended to complete the enclosure and perfect the final hermetic seal of electrolytic device 10.

Figure 2:
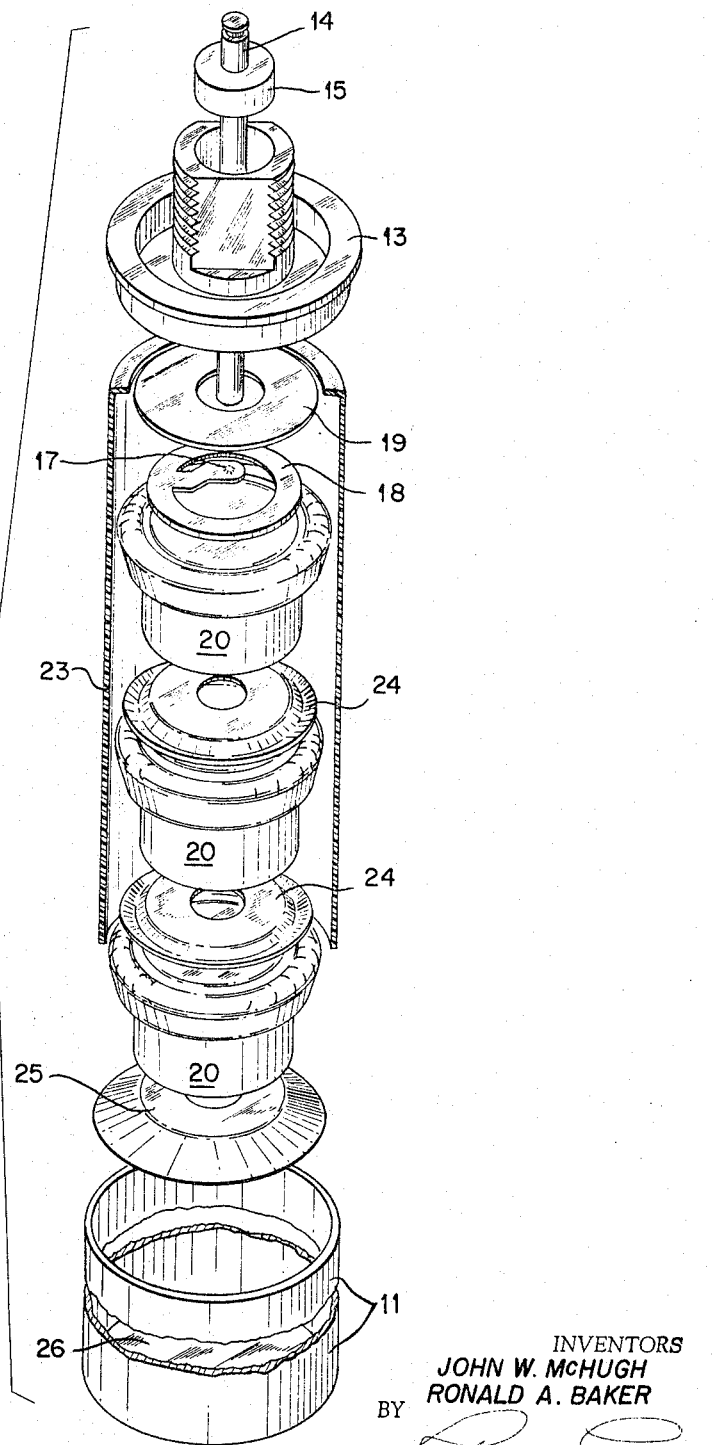
FIGURE 2 is an exploded perspective view of the electrolytic device of the present invention, showing the relationship of component parts.

FIGURE 2 of the drawing presents an exploded view of the component parts which comprise electrolytic device 10. Tubular casing 11 therein is shown in fragmentary perspective and drastically shortened, while the remaining parts are brought out the top of casing 11 and shown in full perspective.

Figure 3:
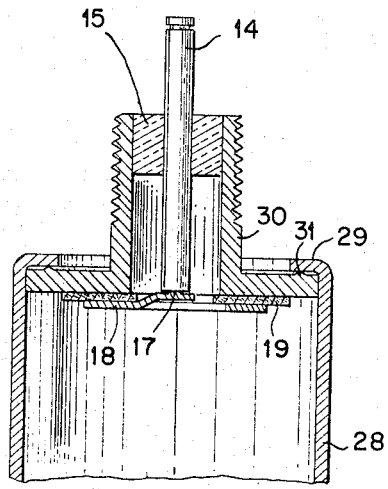
FIGURE 3 is a fragmentary sectional elevation view of the corrosion-resistant container showing an alternate method of making the upper hermetic closure.

An alternate means of making the upper closure for the device of the present invention is shown in FIGURE 3. In this embodiment, tubular case 28, although open at both ends, has a turned over lip 29 at the upper end. Flanged collar 30 is inserted through the bottom of tubular case 28 and a projection ring 31 thereon permits attachment to lip 29 by resistance welding, providing a hermetic seal therewith. The remainder of the unit and the assembly thereof follows the description heretofore presented with reference to FIGURE 1. As before, all container members are constructed of corrosion-resistant material, preferably stainless steel.

Figure 4:
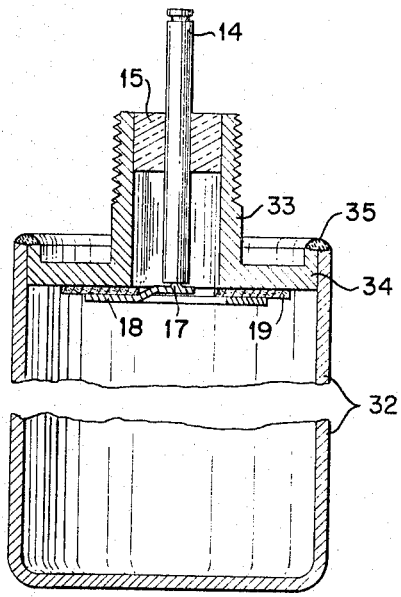
FIGURE 4 is a fragmentary sectional elevation view of the corrosion-resistant container showing still another method of making the upper hermetic closure.

In FIGURE 4 is seen yet another type of enclosure for the plurality of capacitor cells. Therein, casing 32 is container-shaped with only the upper end open. As the initial step in assembly, the liner-enclosed capacitor and spring washer sub-assembly of FIGURE 1 is lowered into casing 32. Flanged collar 33 is thereupon introduced into the upper end of casing 32. The outside diameter of flanged collar 34 fits the bore of casing 32 and has an upwardly projecting shoulder 34 adapted to facilitate the hermetic closure of weld 35. A static load is then applied to the component stack from the top or glass terminal end of the unit. When the exact desired load prevails and the resulting deflection is stabilized, the upper edge of casing 32 is trimmed flush with shoulder 34. A partial circumferential weld is then applied at the location indicated by reference numeral 35. Venting is thereby afforded during the thermal cycling step and the subsequent completion of weld 35 effects the final hermetic seal.

The electrolytic capacitor assembly of the present inventions as hereinbefore described in several of its embodiments, is merely illustrative and not exhaustive in scope. Since many widely different embodiments of the invention may be made without departing from the scope thereof, it is intended that all matter contained in the above description and shown in the accompanying drawings shall be interposed as illustrative and not in a limiting sense.

What is claimed is:

1. In a hermetically sealed capacitor, a capacitor cell, having a head of one polarity and a container of the other, disposed in a case comprising first and second closed openings, a pressure responsive insulative seal mechanically securing said head in closing engagement with the container, insulative means for isolating said cell from the case, hermetically sealed means adjacent said head for closing said first opening of said case, said sealed means including an insulated terminal electrically connected with the head of said cell, a closure member electrically connected to the container of said cell and hermetically closing the second opening of said case, and pre-load means disposed between the container of the cell and said closure member for exerting a sealing force on the cell, the location of said closure member being selectable for controlling the magnitude of said force.

2. In a hermetically sealed capacitor, a capacitor cell, having a head of one polarity and a container of the other, disposed in a case comprising first and second closed openings, a pressure responsive insulative seal mechanically securing said head in closing engagement with the container, insulative means for isolating said cell from the case, hermetically sealed terminal sub-assembly means for closing said first opening of said case, said sealed means including terminal means electrically connected with the head of said cell, collar means engaging with said case and including a bore through which said terminal means projects, and an insulative body for insulating said collar means from said terminal means, closure means electrically connected to the container of said cell and hermetically closing the second opening of said case, and pre-load means disposed between the container of the cell and said closure means for exerting a sealing force on the cell, the location of said closure means being selectable for controlling the magnitude of said force.

3. In a hermetically sealed capacitor, a capacitor cell, having a head of one polarity and a container of the other, disposed in a case comprising first and second closed openings, a pressure responsive insulative seal mechanically securing said head in closing engagement with the container, insulative means for isolating said cell from the case, hermetically sealed terminal sub-assembly means for closing said first opening of said case, said sealed means including terminal means electrically connected with the head of said cell, flanged collar means engaging with said case and including an axial bore through which said terminal means projects, and an insulative body for insulating said collar means from said terminal means, a disc-like closure means electrically connected to the container of said cell and hermetically closing the second opening of said case, pre-load spring means disposed between the container of the cell and said closure means for exerting a sealing force on the cell, the location of said closure means being selectable for controlling the magnitude of said force.

4. In a hermetically sealed capacitor, a plurality of adjacent capacitor cells having a head of one polarity and a container of the other, disposed in a case comprising first and second closed openings, a pressure responsive insulative seal mechanically securing said head of one cell in closing engagement with the container, insulative means for isolating said cells from the case, hermetically sealed means adjacent said head for closing said first opening of said case, said sealed means including an insulated terminal electrically connected with the head of said one cell, closure means electrically connected to the container of said cell and hermetically closing the second opening of said case, conductive means for spacing adjacent cells, and pre-load means disposed between the container of the cells and said closure means for exerting a sealing force on the cell, the location of said closure means being selectable for controlling the magnitude of said force.

5. In a hermetically sealed capacitor, a plurality of adjacent capacitor cells, having a head of one polarity and a container of the other, disposed in a case comprising first and second closed openings, a pressure responsive insulative seal mechanically securing said head of one cell in closing engagement with the container, insulative means for isolating said cells from the case, hermetically sealed means adjacent said head for closing said first opening of said case, said sealed means including an insulated terminal electrically connected with the head of said one cell, collar means engaging with said case and including a bore through which said terminal means projects, and an insulative body for insulating said collar means from said terminal means, closure means electrically connected to the container of said cell and hermetically closing the second opening of said case, conductive means for spacing adjacent cells, and pre-load means disposed between the container of the cell and said closure means for exerting a sealing force on the cell, the location of said closure means being selectable for controlling the magnitude of said force.

6. In a hermetically sealed capacitor, a plurality of capacitor cells, having a head of positive polartiy and a container of negative polarity, disposed longitudinally in series in a case comprising first and second closed openings, a pressure responsive insulative seal mechanically securing said head of one cell in closing engagement with the container, insulative means for isolating said cells from the case, hermetically sealed terminal sub-assembly means for closing said first opening of said case, said sealed means including terminal means electrically connected with the head of said one cell, flanged collar means engaging with said case and including an axial bore through which said terminal means projects, and an insulative body for insulating said collar means from said terminal means, disc-like closure means electrically connected to the container of said cell and hermetically closing the second opening of said case, conductive spring washer means for spacing adjacent cells, and pre-load spring means disposed between the container of the cells and said closure means for exerting a sealing force on the cells, the longitudinal location of said closure means being selectable for controlling the magnitude of said force.

7. In a hermetically sealed capacitor, a capacitor cell, having a head of one polarity and a container of the other, disposed in a case comprising an opening and a bottom wall, a pressure responsive insulative seal mechanically securing said head in closing engagement with the container, insulative means for isolating said head from the case, hermetically sealed means adjacent said head for closing the opening of said case, said sealed means including an insulated terminal electrically connected with the head of said cell, a wall of said case being electrically connected to the container of said cell, and pre-load means disposed between the container of the cell and the bottom wall of said case for exerting a sealing force on the cell, the elasticity of said means being selectable for controlling the magnitude of said force.

8. In a hermetically sealed capacitor, a plurality of adjacent capacitor cells, having a head of one polarity and a container of the other, disposed in a case comprising an opening and a bottom wall, a pressure responsive insulative seal mechanically securing said head of one cell in closing engagement with the container, insulative means for isolating said head from the case, hermetically sealed means adjacent said head for closing the opening of said case, said sealed means including an insulated terminal electrically connected with the head of said one cell, a wall of said case being electrically connected to the container of said cell, conductive means for spacing adjacent cells, and pre-load resilient means disposed between the container of the cells and the bottom wall of said case for exerting a sealing force on the cells, the elasticity of said spring means being selectable for controlling the magnitude of said force.

9. In a hermetically sealed capacitor, a capacitor cell, having a head of one polarity and a container of the other, disposed in case comprising an opening and a bottom wall, a pressure responsive insulative seal mechanically securing said head in closing engagement with the container, insulative means for isolating said head from the case, hermetically sealed terminal means for closing the opening of said case, said sealed means including terminal means electrically connected with the head of said cell, collar means engaging with said case and including a bore through which said terminal means projects, and an insulative body for insulating said collar means from said terminal means, a wall of said case being electrically connected to the container of said cell and pre-load spring means disposed between the container of the cell and the bottom wall of said case for exerting a sealing force on the cell, the elasticity of said spring means being selectable for controlling the magnitude of said force.

10. The method of assembling a hermetically sealed electrolytic capacitor comprising the steps of hermetically joining a cap member including an insulated seal terminal in one end of a tubular casing, placing a capacitor which comprises a container-cathode, an anode head having a resilient pressure-responsive insulated seal, in said case, engaging said terminal with said head, introducing preload pressure exerting means into said case and in engagement with the container of said capacitor, introducing a slidable member into the other end of said case, exerting a compressive force on said pressure exerting means and joining said slidable member at the other end of said case hermetically sealing the capacitor.

11. The method of assembling a hermetically sealed electrolytic capacitor comprising the steps of hermetically joining a cap member including an insulated seal terminal in one end of a tubular casing, placing a plurality of capacitor cells in longitudinal succession, spacing each of said cells with conductive spring washer means, placing said cells in said case, each of said cells comprises a container-cathode, an anode head having a resilient pressure-responsive insulated seal, engaging said terminal with said head of a first one of said cells, introducing preload pressure exerting means into siad case and in engagement with the container of a last one of said capacitor cells, introducing a slidable member into the other end of said case, exerting a compressive force on said pressure exerting means, and joining said slidable member at the other end of said case hermetically sealing the capacitor.

12. The method of assembling a hermetically sealed electrolytic capacitor comprising the steps of introducing preload pressure exerting means into a case having an opening and a bottom wall so that said pre-load means engages with said bottom wall of said case, placing a capacitor, which comprises a container-cathode, an anode head having a resilient pressure-responsive insulated seal, in said case, locating a cap member including an insulated seal terminal in said open end of said casing, engaging said terminal with said head, exerting a compressive force on said cap member so as to displace said preload means thereby storing energy therein, and joining said case thereby hermetically sealing the capacitor.

No references cited.

JOHN W. HUCKERT, *Primary Examiner.*

J. D. KALLAM, *Assistant Examiner.*